May 6, 1924.

S. J. BERGERON ET AL 1,493,425

SHRIMP SHELLING MACHINE

Original Filed Sept. 2, 1922   2 Sheets-Sheet 1

Fred Chauvin
and Shelly J. Bergeron, Inventor

By Mason, Fenwick & Lawrence
Attorney

May 6, 1924.

S. J. BERGERON ET AL 1,493,425

SHRIMP SHELLING MACHINE

Original Filed Sept. 2, 1922     2 Sheets-Sheet 2

Fred Chauvin
Shelly J. Bergeron
Inventors

By Mason, Fenwick & Lawrence
Attorney

Patented May 6, 1924.

1,493,425

UNITED STATES PATENT OFFICE.

SHELLY J. BERGERON AND FRED CHAUVIN, OF HOUMA, LOUISIANA, ASSIGNORS TO BLUM AND BERGERON, OF HOUMA, LOUISIANA, A FIRM COMPOSED OF LEOPOLD BLUM, SHELLY J. BERGERON, AND THE ESTATE OF A. ST. MARTIN.

SHRIMP-SHELLING MACHINE.

Application filed September 2, 1922, Serial No. 585,979. Renewed March 29, 1924.

*To all whom it may concern:*

Be it known that we, SHELLY J. BERGERON and FRED CHAUVIN, both citizens of the United States, residing at Houma, in the Parish of Terrebonne and State of Louisiana, have invented certain new and useful Improvements in Shrimp-Shelling Machines; and we do hereby declare the following to be a full, clear, and exact description of the invention, such as will enable others skilled in the art to which it appertains to make and use the same.

This invention relates to a machine for cleaning shrimp by removing the shells from the same after they have been dried.

The method heretofore employed in removing shell from shrimp has consisted in putting a small quantity of dried shrimp in sacks, beating the same and finally sifting the contents of the sack. This method, however, is not only laborious and expensive, but also results in breaking much of the shrimp in such a way as to make it unfit for food.

It is an object of this invention to provide a machine in which shrimp can be cleaned with minimum breakage as well as rapidly and at low cost.

The various features of novelty will appear from the detailed description of the invention taken in connection with the accompanying two sheets of drawings forming part of this specification, and in which.

Figure 1:
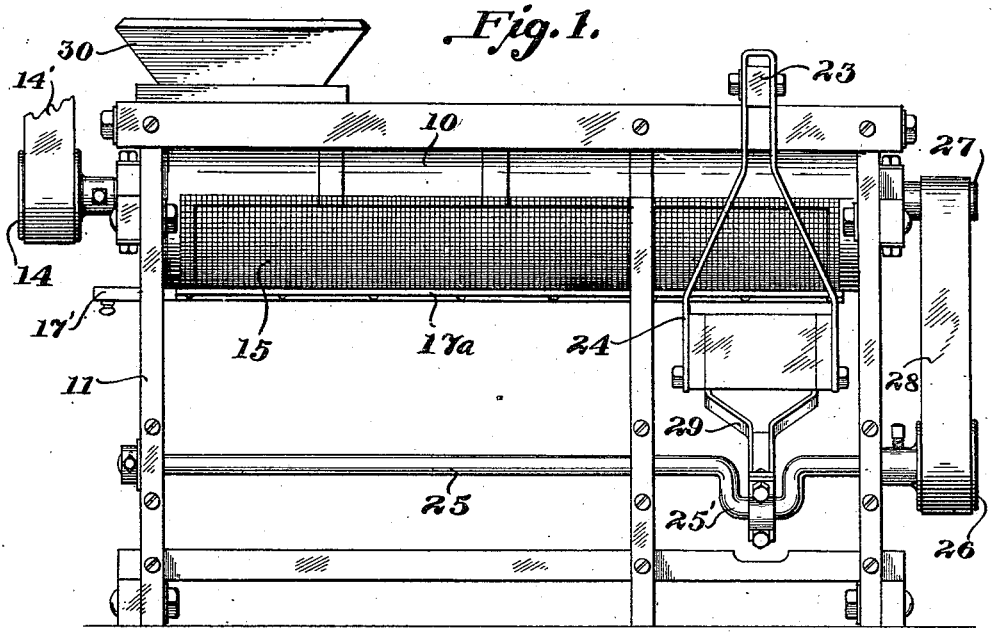
Figure 1 is a rear elevation of the improved machine.
Figure 2:
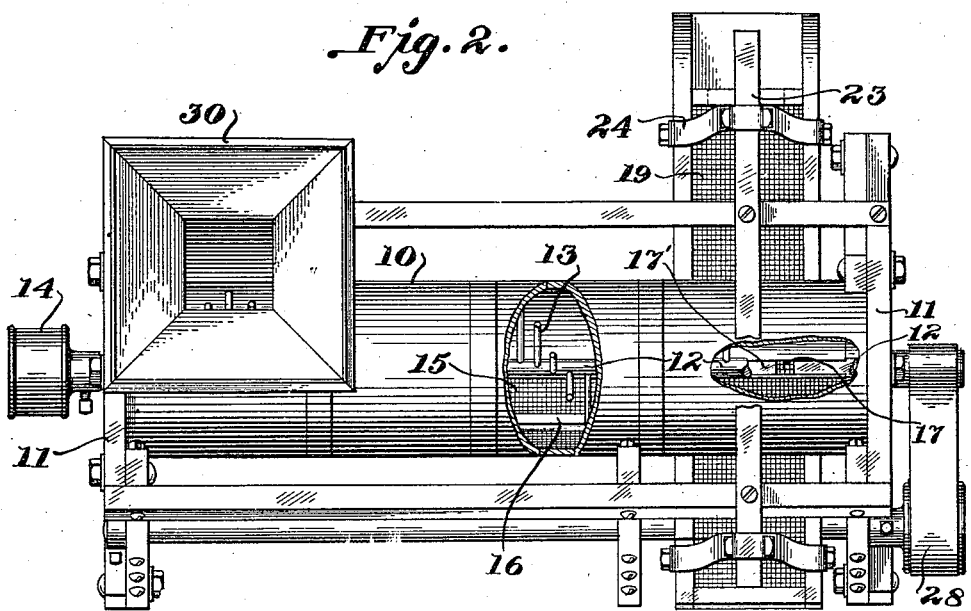
Fig. 2 is a plan view thereof, parts being broken away.
Figure 3:
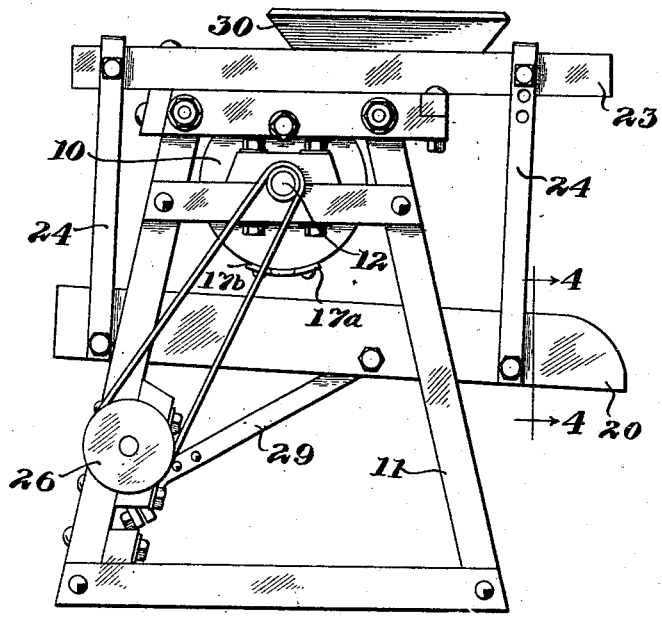
Fig. 3 is an end elevation of the machine.
Figure 4:
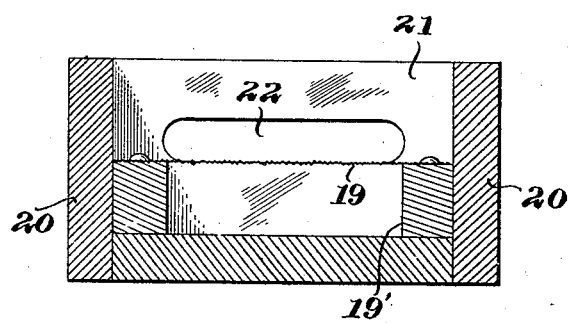
Fig. 4 is a section on line 4—4 of Fig. 3.

Referring to the drawings, 10 indicates a cylinder or barrel non-rotatably secured in horizontal position in a suitable frame, the upright members thereof being indicated at 11. Extending through the cylinder and journalled in the end closures thereof is a shaft 12 having radial projections or beater fingers 13 helically disposed around the shaft. This shaft has a pulley 14 at one end thereof whereby it may be driven as by a belt 14'.

A portion of the lower half of the cylinder comprises a screen 15. Extending longitudinally of the cylinder is a strip 16 against which the screen 15 abuts, this strip serving to support the screen.

The bottom of the cylinder is provided with a longitudinally extending slot 17 which is normally closed by a gate member in the form of a narrow strip 17'. This gate or strip is held in slidable relation with the cylinder in any suitable manner as by guide strips 17ª and 17ᵇ.

When the gate or strip 17' is drawn longitudinally of the cylinder, the material therein will fall onto the shaker screen 19 arranged below the cylinder. This screen comprises a rectangular frame 20 having a barrier 21 at one end thereof through which is a slot 22 on a level with the screen 19.

The screen is preferably mounted in a frame 19' which can be removed from the frame 20.

The shaker screen is supported from the main frame as by a transversely extending beam 23, from the ends of which depend stirrup members 24 to the lower ends of which the shaker screen frame 20 is pivotally secured. The shaker screen is reciprocated by means of a shaft 25 suitably mounted in the main frame 11, this shaft having a pulley 26 at one end thereof in alignment with a pulley 27 on the shaft 12, said pulleys being connected by a belt 28. The shaft 25 has a crank 25' to which is connected a pitman 29 which at its other end is pivotally connected to the shaker frame 20.

At one end of the cylinder is a hopper 30 into which the dried shrimp is dumped from which it feeds into the cylinder, this hopper being disposed at one side of the cylinder as shown.

The operation of the machine is substantially as follows: Dried shrimp is dumped into the hopper. The shaft 12 is rotating quite rapidly and the radial fingers thereof, therefore, strike the shrimp with considerable force, thus breaking the shells of the shrimp. In view of the fact that the fingers 13 are arranged about the shaft 12 in the form of a helix, the action of the fingers is to gradually move the mass of shrimp toward the discharge end of the cylinder which, as already indicated, is above the screen 19. During this beating operation by the fingers some of the shell will be broken very fine and this will pass through the screen 15. The gate or slide 17' can be maintained closed for a period if so desired, but ordinarily it may be opened sufficiently to allow material to pass out through the bottom opening 17 from the cylinder into the shaker screen. The shaker screen serves to sift out the shell dust and broken up parts of shrimp, the larger pieces gravitating down the screen and out through the opening 22 in the barrier.

As already indicated, the gate or slide 17' closes the longitudinally extending opening 17 in the bottom of the cylinder, consequently, the cleaning or the removal of undesirable matter from the cylinder can easily be effected by merely drawing out the gate or slide 17'.

The screen 15 is preferably secured to the outside of the cylinder, this arrangement spacing the same somewhat further from the terminals of the beater fingers than the walls proper of the cylinder. The tendency for the shrimp is, therefore, to fall back on the screen 15 with the result that the shell adhering to the shrimp will gradually leave the same and pass out through the screen.

The above described machine has been found to function very efficiently and reduces the breakage of the shrimp and the cost of shelling the same very materially.

What we claim is:

1. In combination, a cylinder, a beater therein, said beater comprising a helical row of radially disposed fingers, and a screen constituting a portion of the lower wall of the cylinder, a support for said screen extending longitudinally of said cylinder, said screen being spaced farther from the terminals of said fingers than the walls of the cylinder proper.

2. In combination, a cylinder, a beater therein, said beater comprising a longitudinally extending shaft having radially projecting fingers, a screen constituting part of the lower wall of said cylinder, and a gate normally closing an axially extending slot in the bottom of the screen.

3. In combination, a cylinder, a hopper at one end of the cylinder and a discharge opening at the other end of the cylinder in the bottom thereof, a beater arranged within the cylinder, said beater constituting a shaft having radially extending fingers arranged in the form of a helix, a screen constituting part of the lower walls of said cylinder, said screen lying in a cylindrical surface of larger diameter than the other walls of the cylinder, and a gate for varying the size of the discharge opening.

In testimony whereof we affix our signatures.

SHELLY J. BERGERON.
FRED CHAUVIN.